United States Patent [19]
Herrmeyer

[11] Patent Number: 5,466,103
[45] Date of Patent: Nov. 14, 1995

[54] ARTICLE UNLOADING SYSTEM AND METHOD

[75] Inventor: Dennis C. Herrmeyer, Paola, Kans.

[73] Assignee: Rigid Form, Inc., Paola, Kans.

[21] Appl. No.: 82,023

[22] Filed: Jun. 23, 1993

Related U.S. Application Data

[63] Continuation-in-part of Ser. No. 11,895, Feb. 1, 1993, Pat. No. 5,273,337.

[51] Int. Cl.⁶ ................................................ B60P 7/12
[52] U.S. Cl. ................ 410/33; 193/5; 193/17; 193/38; 221/194; 410/43; 414/537
[58] Field of Search ................ 296/3, 4, 24.1; 414/522, 537, 498, 276; 221/69, 194; 193/4, 5, 17, 38, 40; 410/2, 43, 33; 211/59.2, 162, 171

[56] References Cited

U.S. PATENT DOCUMENTS

| | | | |
|---|---|---|---|
| 760,634 | 5/1904 | Lanpher | 193/5 |
| 812,009 | 2/1906 | Brazeal | 193/5 |
| 1,750,128 | 3/1930 | Romine | 410/2 |
| 3,127,177 | 3/1964 | Benkoe | 221/194 |
| 3,501,195 | 3/1970 | Kramer, III | 296/3 |
| 4,288,195 | 9/1981 | Brewwer | 414/498 |
| 4,455,119 | 6/1984 | Smith | 414/537 |
| 4,982,851 | 1/1991 | Konstant | 211/162 |

Primary Examiner—Michael S. Huppert
Assistant Examiner—Gregory A. Morse
Attorney, Agent, or Firm—Litman, McMahon and Brown

[57] ABSTRACT

An article unloading system for unloading articles from an article rack includes a pair of unloading ramps which are removably and pivotably attached to the rack beneath an upper article slot in the rack. The ramps are connected by a cross-member which is connected to a jack. A workman's platform is also removably attachable to the rack below the connection point of the ramps, and the jack is connected between the ramps and the platform. An article is slid from the upper article slot onto the ramps and latched into place. The ramps are then lowered via the jack to a position in which the article can be easily reached, the latch is remotely released and the article is off-loaded. The article rack can be a specialized rack with multiple stacked slots for carrying pickup truck covers and the articles to be unloaded can be pickup truck covers from upper slots within the rack.

24 Claims, 5 Drawing Sheets

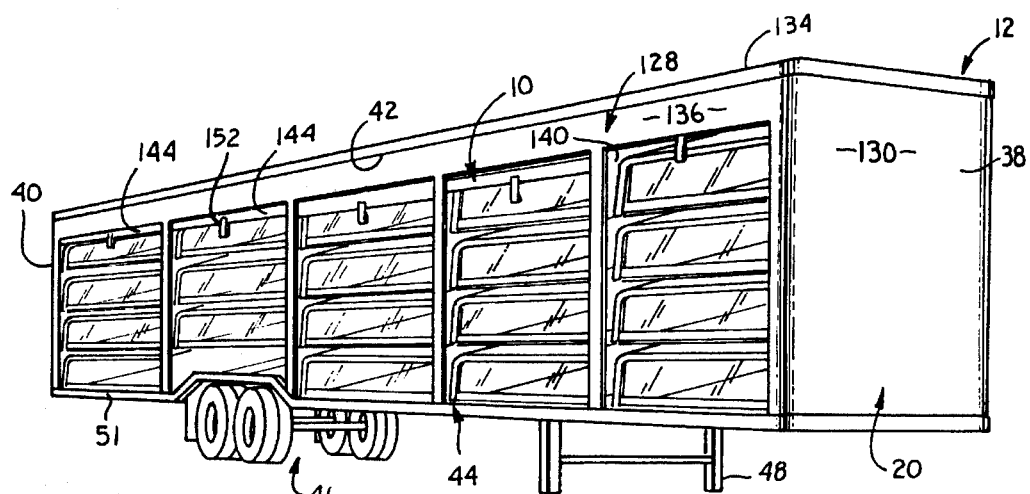
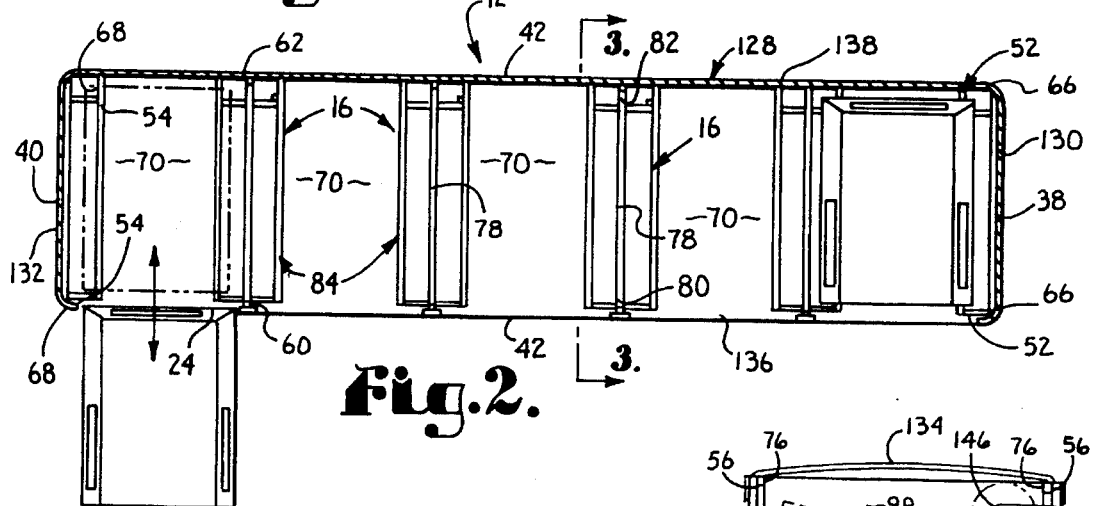
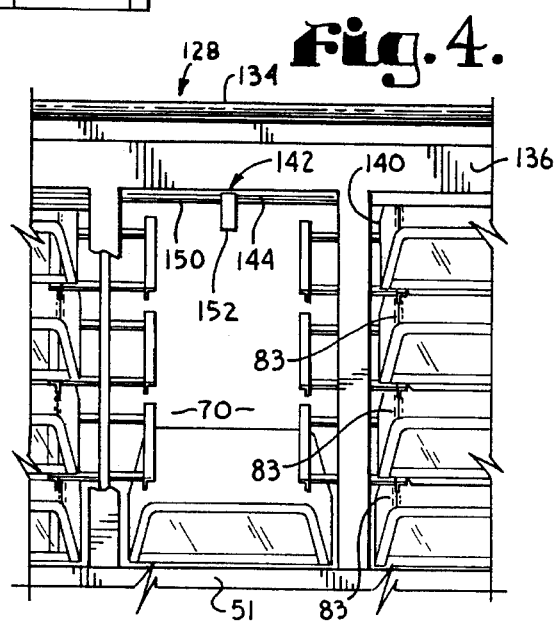
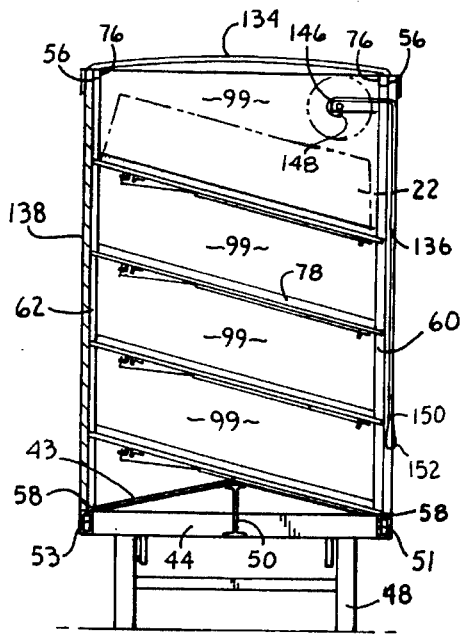

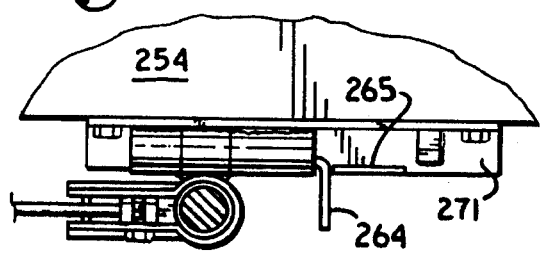
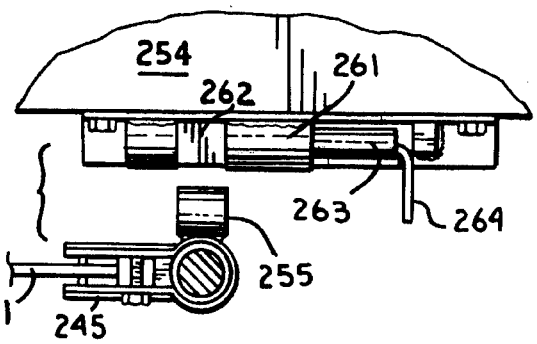
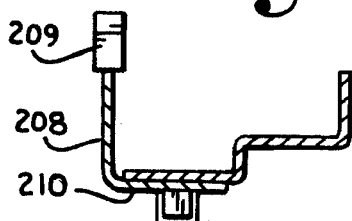
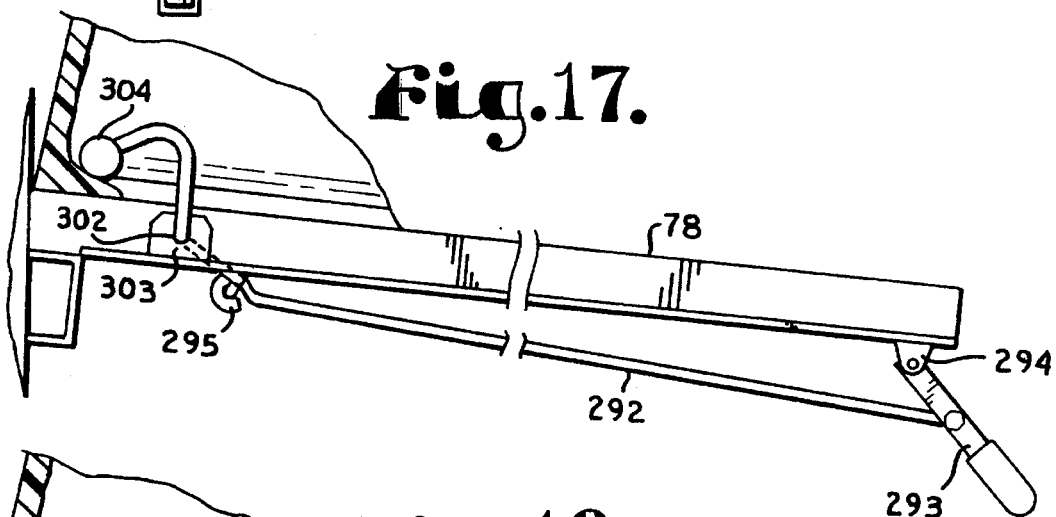
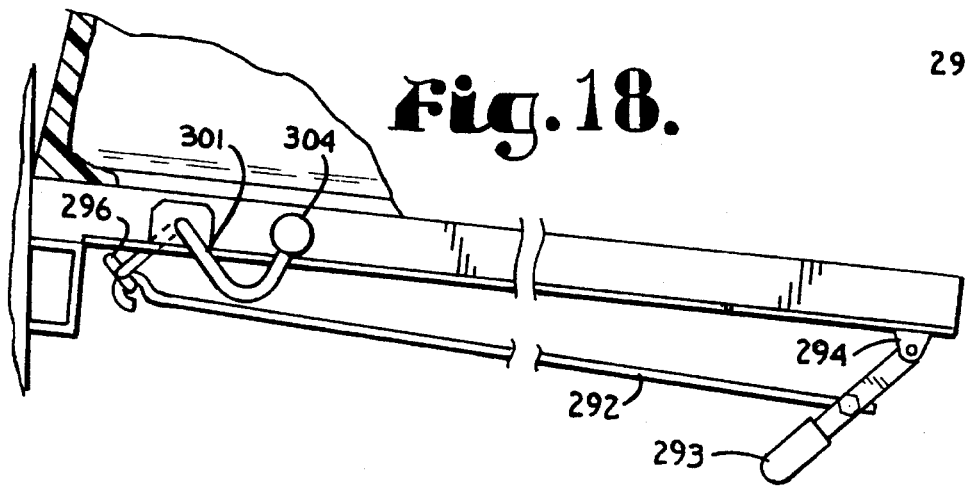

5,466,103

ARTICLE UNLOADING SYSTEM AND METHOD

CROSS REFERENCE TO RELATED APPLICATIONS

This application is a continuation-in-part of patent application Ser. No. 08/011,895, now U.S. Pat. No. 5,273,337 filed Feb. 1, 1993 and entitled Article Rack.

BACKGROUND OF THE INVENTION

1. Field of the Invention

The present invention relates generally to an article unloading system, and in particular to such an apparatus which is adapted for mounting on an article rack in a trailer or truck bed chassis, and more specifically to such an unloading system which is adapted to allow pickup truck covers to be conveniently unloaded from upper positions in racks within the trailer or truck bed chassis.

2. Description of the Related Art

Article racks are used in a wide variety of applications, and are often designed to receive particular types of articles in particular environments. The physical characteristics, i.e., size, shape, weight, etc., of the articles to be stored or transported are often factors in designing a suitable rack. Other factors can include loading and unloading considerations, protection from the elements and space limitations for the rack itself.

Article racks are often associated with vehicles and consequently involve special design considerations to accommodate vehicle movement. For example, the Day U.S. Pat. No. 1,438,813 and the Prickett et al. U.S. Pat. No. 2,839,328 disclose truck bodies with shelves for receiving cases of bottled goods. The shelves slope inwardly and downwardly to retain the cases of goods in place against centrifugal forces which may be encountered when the vehicles turn and maneuver. A trailer vehicle with a similar construction is shown in the Robinson U.S. Pat. No. 2,061,673.

Pickup truck covers are a popular accessory or option for enclosing the beds of pickup trucks on which they are mounted. By thus enclosing the bed with a pickup truck cover, security and protection are provided for tools, materials and various other objects placed in the enclosed pickup truck bed. Pickup truck beds enclosed by covers can also be used as sheltered sleeping quarters.

Pickup truck covers can be fabricated from various materials, including fiberglass, fiber reinforced plastic (FRP), and sheet metal. Pickup truck covers are generally manufactured at manufacturing facilities and then transported to dealers for retail sale. Pickup truck cover transport vehicles are sometimes utilized which include racks for receiving the pickup truck covers in orientations which are transverse to the direction of vehicle travel. The covers are generally loaded and unloaded from the vehicle sides, and the racks can be divided into multiple, transversely-extending bays, which each bay being adapted to receive multiple covers in vertically-stacked, cover-receiving spaces. To further increase the number of covers that can be transported in a load, smaller covers can be nested within larger one.

Many previous cover transports are designed for the covers to lay flat and extend transversely from side-to-side. However, relatively long covers oriented in this manner can exceed the load width restrictions applicable on many public roads and highways. Operators of vehicles with over-width loads can be subject to citations and fines by law enforcement officials.

Furthermore, difficulties have been encountered in providing an enclosure for a cover transport, because the enclosure structure further increases the cover transport width, which can result in a vehicle which is illegal to operate on many public roads and highways. However, there are important advantages to enclosing a cover transport. For example, covers transported in enclosed vehicles can be kept cleaner for better appearances when displayed by a dealer, whereby a substantial amount of dealer preparation may be obviated. A transport enclosure can also protect the covers therein from damage from hail, rocks and other falling and flying objects. Degradation of the finish on the covers can also be avoided by shading the covers from direct sunlight. A measure of security and theft protection can be provided by enclosing the cover transports.

An additional problem which occurs in the transportation of pickup truck covers is the loading, and, in particular, the unloading of such covers from the topmost positions in the cover transports. Presently, in order to off-load the covers occupying the topmost slots in a transport rack, either the receiving dealer must use a forklift truck or provide three or more men who climb up the trailer and manhandle the cover off of the rack. Forklifts are expensive to purchase and maintain and thus represent a luxury which most small dealers cannot afford. However, when the pickup truck covers are physically manhandled, it is common for them to be accidentally dropped off of the transport or banged into other covers with consequent damage or destruction to the affected covers. The problem is magnified in instances where the covers are transported in closed trailers since access to the enclosed covers is limited. Individual pickup truck covers can cost as much as $2000 and it is estimated that the mishandling of pickup truck covers, particularly during unloading, costs the industry millions of dollars per year.

The article rack of the present invention addresses these problems with previous cover transports and similar problems that may exist with other article racks. The unloading system of the present invention allows pickup truck covers to be conveniently and safely unloaded by two men from even the topmost rack positions.

SUMMARY OF THE INVENTION

In the practice of the present invention, an article rack is provided for mounting on a vehicle chassis. The article rack includes a frame structure forming multiple bays which extend transversely between opposite sides. Each bay includes multiple, vertically-stacked article-receiving spaces, each space being accessible through an opening at one side of the frame structure. A rail assembly includes multiple rail subassemblies, pairs of which are associated with the article-receiving spaces and are adapted for supporting articles therein. The rail assemblies slope upwardly from the frame side openings associated therewith to the opposite side of the frame whereby articles are supported thereon in sloping configurations. A retainer assembly is also associated with each article-receiving space and is mounted on a rail subassembly therein, the retainer assemblies being adapted for retaining an article in the article-receiving space. A frame enclosure is provided for mounting on the frame structure and enclosing the article rack, and includes retractable closures for selectively covering the frame structure side openings. The vehicle chassis can be retrofitted with a longitudinal center beam for reinforcement.

An article unloading system associated with the article rack includes a pair of ramp members which are removably and pivotably connectable below the topmost receiving slot position on the article rack with a rigid cross member connected between the two ramp members. A work platform is removably connectable adjacent one of the lower receiving slots and a jack is positionable between the work platform and the ramp member rigid cross member. A remotely releasable article holding arm is positioned atop each of the ramp members to hold the article in place and, once released, to allow the article to slide down the ramp members to a stop. The jack can then be lowered and the article, e.g. a pickup truck cover, easily off-loaded by two workmen.

OBJECTS AND ADVANTAGES OF THE PRESENT INVENTION

The objects and advantages of the present invention include: providing an article rack; providing an article rack adapted for mounting on a vehicle chassis; providing an article rack adapted for supporting articles in transversely-sloping positions; providing an article rack which has a width less than the lengths of articles placed therein due to the sloping positions of the articles; providing an article rack which, when mounted on a vehicle chassis, enables relatively long articles placed transversely thereon in sloping positions to be transported legally over certain roads and highways; providing an article rack which is relatively easy to load and unload; providing an article rack which is adapted to be enclosed; providing an article rack which provides a relatively high degree of protection for articles placed thereon; providing an article unloading apparatus and method which permits two workmen to easily and safely unload an article from the topmost position in the rack; to provide such an unloading system which is easily and quickly attachable and removable for convenient storage; to provide such an unloading system which allows bulky articles, such as pickup truck covers, to be safely removed from the topmost rack position with minimal risk of damage to the article or injury to the workmen; and providing an article rack and an unloading system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a right front perspective view of an article rack embodying the present invention and incorporated in an enclosed trailer.

FIG. 2 is a top plan view of the article rack within the trailer, shown with the trailer roof removed.

FIG. 3 is an enlarged, vertical, cross-sectional view of the trailer, taken generally along line 3—3 in FIG. 2.

FIG. 4 is an enlarged, fragmentary, right-side elevational view of the trailer.

FIG. 14 is an enlarged, fragmentary cross-sectional view of the connection of a jack stand to a workman's support platform, taken along line 14—14 of FIG. 11.

FIG. 15 is an enlarged, fragmentary cross-sectional view of the removal of the jack stand from the workman's support platform.

FIG. 16 is an enlarged, fragmentary cross-sectional view of the pickup truck cover support arm, taken along line 16—16 of FIG. 12.

FIG. 17 is an enlarged, fragmentary side elevational view of a remotely controllable article latching mechanism within the article rack, and with the latching mechanism in an article engaging position.

FIG. 18 is an enlarged, fragmentary side elevational view of a remotely controllable article latching mechanism within the article rack, and with the latching mechanism in a disengaged position.

DETAILED DESCRIPTION OF THE PREFERRED EMBODIMENTS

I. Introduction and Environment

Figure 5:
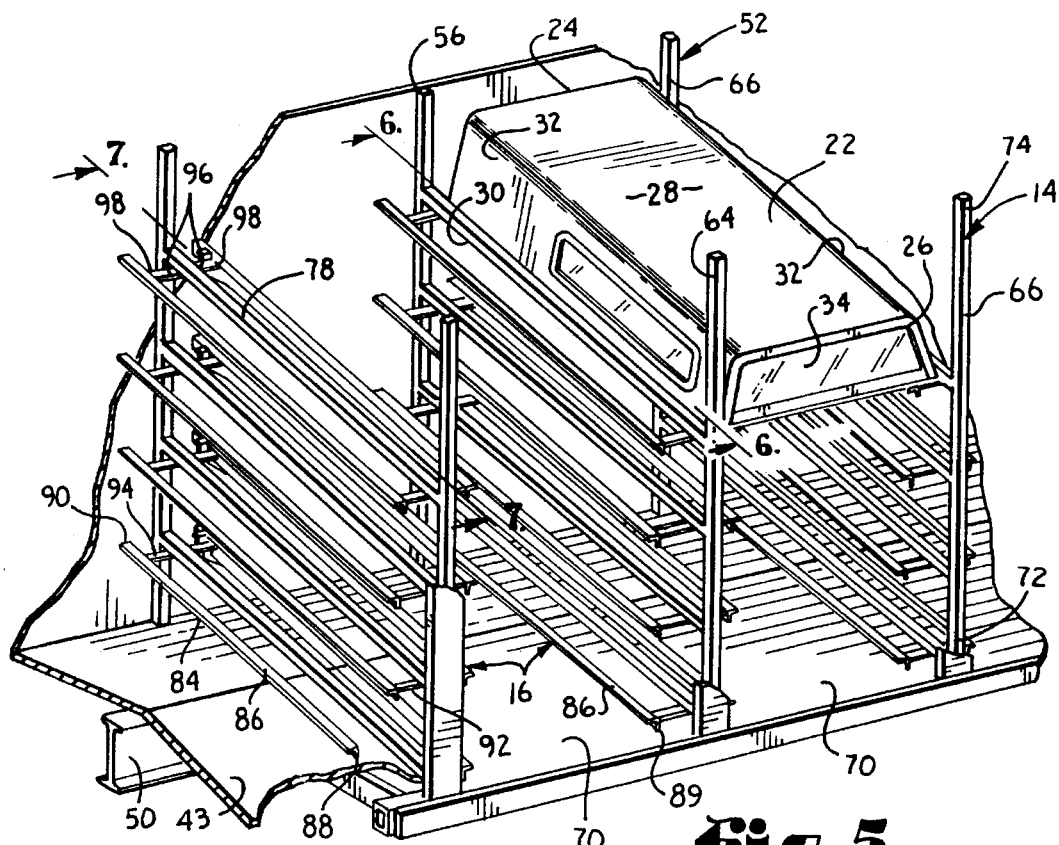
FIG. 5 is an enlarged, fragmentary, top rear right-side perspective view of the article rack and trailer.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned derivatives thereof and words of similar import.

Referring to the drawings in more detail, reference numeral 10 generally designates an article rack embodying the present invention. The article rack 10 is shown mounted in a vehicle 12 comprising a trailer, and generally includes a frame structure 14, a rail system 16, a retainer system 18 and an enclosure system 20.

Figure 6:
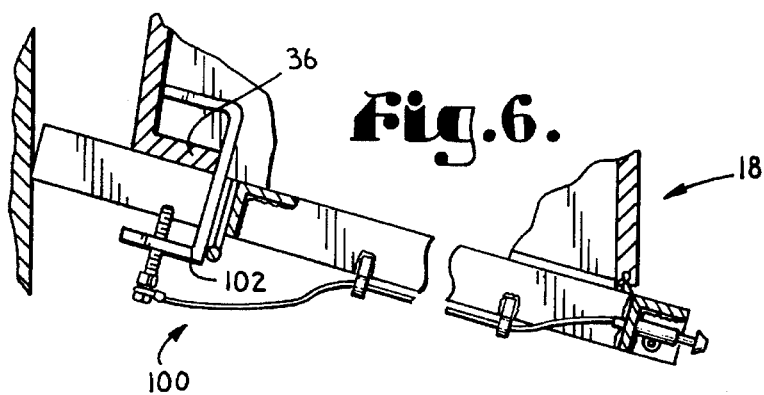
FIG. 6 is an enlarged, fragmentary, cross-sectional view of the article rack and trailer, taken generally along line 6—6 of FIG. 5 and particularly showing a retainer mechanism in its locked position.
Figure 7:
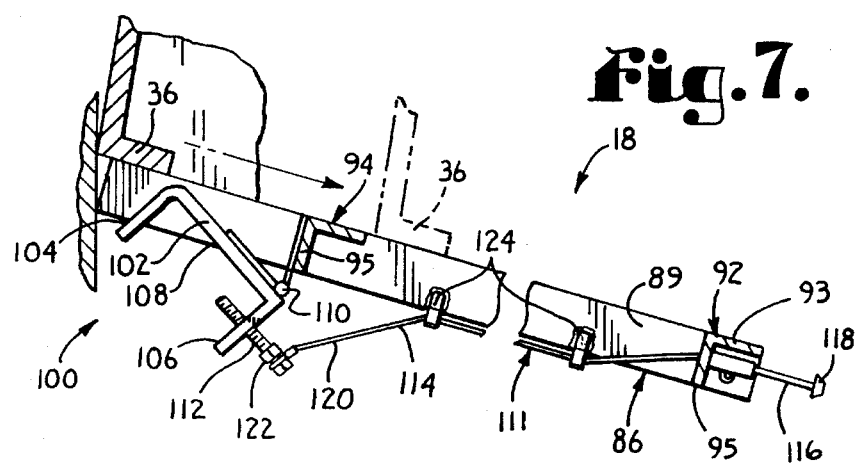
FIG. 7 is an enlarged, fragmentary, vertical, cross-section view of the article rack and trailer, similar to FIG. 6 and particularly showing the retainer mechanism in its release position.

Without limitation on the generality of useful applications for article racks embodying the present invention, the article rack 10 is shown and described as being designed to receive, support and transport pickup trucks covers 22 each including a front end 24, a back end 26, a top 28, a bottom 30 and opposite sides 32. The cover back ends 26 slope downwardly and rearwardly, and include doors 34. The cover front ends 24 include rearwardly-extending lower edge flanges 36 (FIGS. 6 and 7).

II. Trailer 12

Without limitation on the generality of useful installations of the article rack, 10, it is shown mounted on the trailer 12. Alternatively, the rack 10 could be mounted on a truck bed or could be retrofitted in or on a preexisting trailer or truck bed.

As best shown in FIGS. 1–3, the trailer 12 includes a front end 38, a back end 40 and opposite sides 42. A chassis 44 mounts a wheel assembly 46 and a support leg assembly 48. The chassis 44 can include a center beam 50 and first and second rim members or beams 51, 53 extending longitudinally between the trailer from and back ends 38, 40. The center beam 50 can have the configuration of an I-beam (as shown in FIG. 3) or a box beam (not shown) and can be approximately centered between and parallel to the trailer opposite sides 42.

III. Frame Structure 14

The frame structure 14 includes a front end 52, a back end 54, a top 56, a bottom 58 and first and second sides 60, 62. A plurality of vertical columns 64 are arranged in transversely-opposed pairs with each column pair having a column located on each frame structure side 60, 62. A frontmost column pair 66 is positioned at the frame structure front end 52 and a rearmost column pair 68 is positioned at the frame structure back end 54. A plurality (e.g. five are shown) of frame structure bays 70 are formed between the pairs of columns 64, each bay 70 extending transversely between the frame structure opposite sides 60, 62. The columns 64 include lower ends 72 connected to the trailer chassis 44 and upper ends 74 interconnected by longitudinally-extending longitudinal members 76.

The opposed pairs of columns 64 are interconnected by transverse cross member 78 which extend transversely between the frame structure sides 60, 62 and slope downwardly from the second side 62 to the first side 60 at angles of approximately fifteen degrees with respect to horizontal. Each cross member 78 includes a first end 80 connected to a column 64 at the first side 60 and a higher second end 82 connected to a column 64 at the second side 62.

The frame structure 14 can comprise square steel tubing, angle sections, I-beams or any other suitable structural members. Gusset plates, bracing and the like can be provided to stiffen the frame structure 14.

IV. Rail System 16

The rail system 16 includes a plurality of rail subassemblies 84 arranged in longitudinally opposed pairs on the fronts and backs of respective bays 70. Each rail subassembly includes a transverse angle section member 86 with first or lower and second or upper ends 88, 90 located in proximity to the frame structure first and second sides 60, 62. First or lower and second or upper rail mounting members 92, 94 extend longitudinally into the bays 70 from proximate ends 96 connected to respective cross members 78 to distal ends 98 connected to respective rail angle section members 86. The rail mounting members 92, 94 associated with the frontmost and rearmost column pairs 66, 68 extend rearwardly and forwardly only; all of the other rail mounting members 92, 94 are provided in pairs extending both forwardly and rearwardly from respective cross members 78. The paired mounting members 92, 94 can be formed from continuous lengths of material whereby their respective proximate ends 96 are centered on the cross members 78. Thus, except for the cross members 78 extending between the frontmost and rearmost column pairs 66, 68, rail subassemblies 84 are located both in front of and behind respective cross members 78.

The rail members 86 are substantially parallel to the cross members 78, with the cross members 78 generally centered between and extending parallel to respective pairs of rail members 86. The rail angle-section members 86 can comprise steel angle-section with horizontal legs 86 located on top of and projecting into respective bays 70 from vertical legs 89. Each rail mounting member 92, 94 can also comprise steel angle-section, with upper horizontal legs 93 mounted (e.g. welded) on the undersides of respective cross members 78 and vertical legs 95 depending downwardly from the horizontal legs 93. The mounting member distal ends 98 are secured to respective rail members 86, e.g. by welding.

Each bay 70 is subdivided into a plurality of article-receiving spaces 99 (e.g., see FIG. 3, four spaces 99 are shown in each bay 70) by respective, opposed pairs of rail subassemblies 84. Each article-receiving space 99 is thus positioned above a respective opposed pair of rail subassemblies 84 and extends transversely with an upward slope from the frame structure first side 60 to the frame structure second side 62. The frame structure 14 includes a plurality of openings 83 at its first side 60, each opening 83 being associated with a respective bay 99.

V. Retainer System 18

A retainer system 18 for the covers 22 is shown in detail in FIGS. 6 and 7 and can comprise a plurality of retainer mechanism 100 each associated with a respective article-receiving space 99.

Each retainer mechanism 100 includes a retainer bracket 102 with a channel-shaped cross-sectional configuration including upper and lower flanges 104, 106 interconnected by a web 108. Each bracket 102 is pivotally connected to a respective second or upper rail mounting member 94 by a hinge 110 connected to a respective rail mounting member vertical leg 95 and the retainer bracket web 108. A bolt 112 is threadably received in the lower flange 106 and depends downwardly therefrom. A retainer actuating subassembly 111 is associated with each retainer mechanism 100 and includes a release cable 114 with a first cable end 116 extending through a respective first rail mounting member 92 and connected to a retainer release handle 118 and a second cable end 120 secured by a nut 122 to the bolt 112 at the head end of the bolt 112 below the bracket lower flange 106. The cable 114 slidably passes through cable guides 124 on the vertical leg 89 of the rail member 86.

VI. Enclosure System 20

The enclosure system 20 includes a frame structure enclosure 128 with front, back, top, first side and second side panels 130, 132, 134, 136 and 138 respectively, as shown in FIG. 1. The enclosure front panel 130 can be forwardly-convex, forwardly-converging, forwardly-tapered or otherwise aerodynamically shaped to reduce wind resistance of the article rack 10 in motion. The first side panel 136 includes a plurality (five are shown) of enclosure panel openings 140 which generally align with and correspond to the frame structure openings 83.

Each frame structure opening 83 and enclosure panel opening 140 can be selectively closed by a respective overhead door assembly 142. Each overhead door assembly 142 includes a flexible (e.g. fabric or slatted) door 144 adapted to selectively cover respective openings 83, 140 in a closed position and adapted to be wound on a take-up reel mechanism 146 in a retracted position. Each door 144 includes a proximate end 148 attached to the take-up reel mechanism 146 and a distal end 150 with a handle 152; the distal end 150 can be attached and locked to the vehicle chassis 44 with the door 144 in its closed position.

VII. Unloading System

Figure 9:
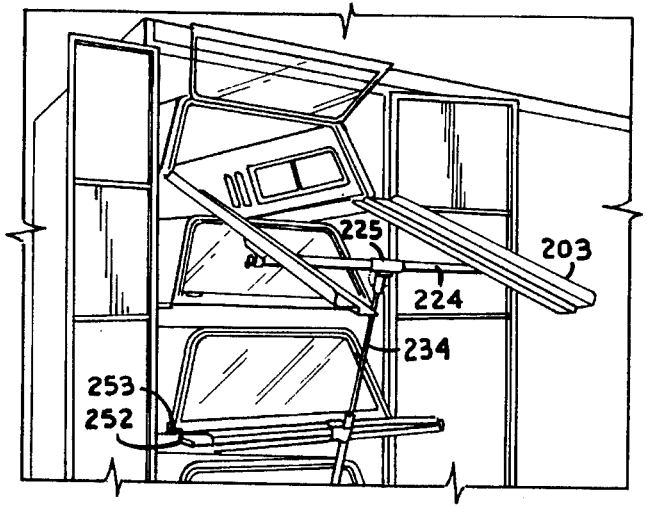
FIG. 9 is a perspective view of the unloading system positioned on the pickup truck cover trailer and with a pair of unloading ramps arranged in a lowered position.
Figure 10:
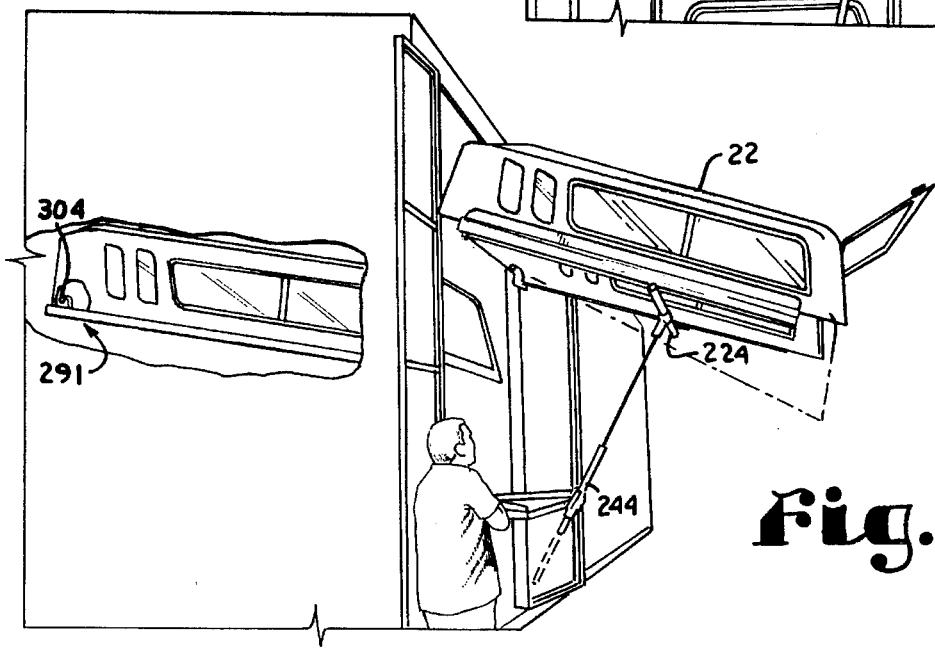
FIG. 10 is a perspective view of the unloading system positioned on the pickup truck cover trailer and with a pickup truck cover positioned on the pair of unloading ramps and with a workman lowering the unloading ramps from a raised position (solid lines) to a lowered, off-loading position through an arc (phantom lines).
Figures 11, 12, 13:
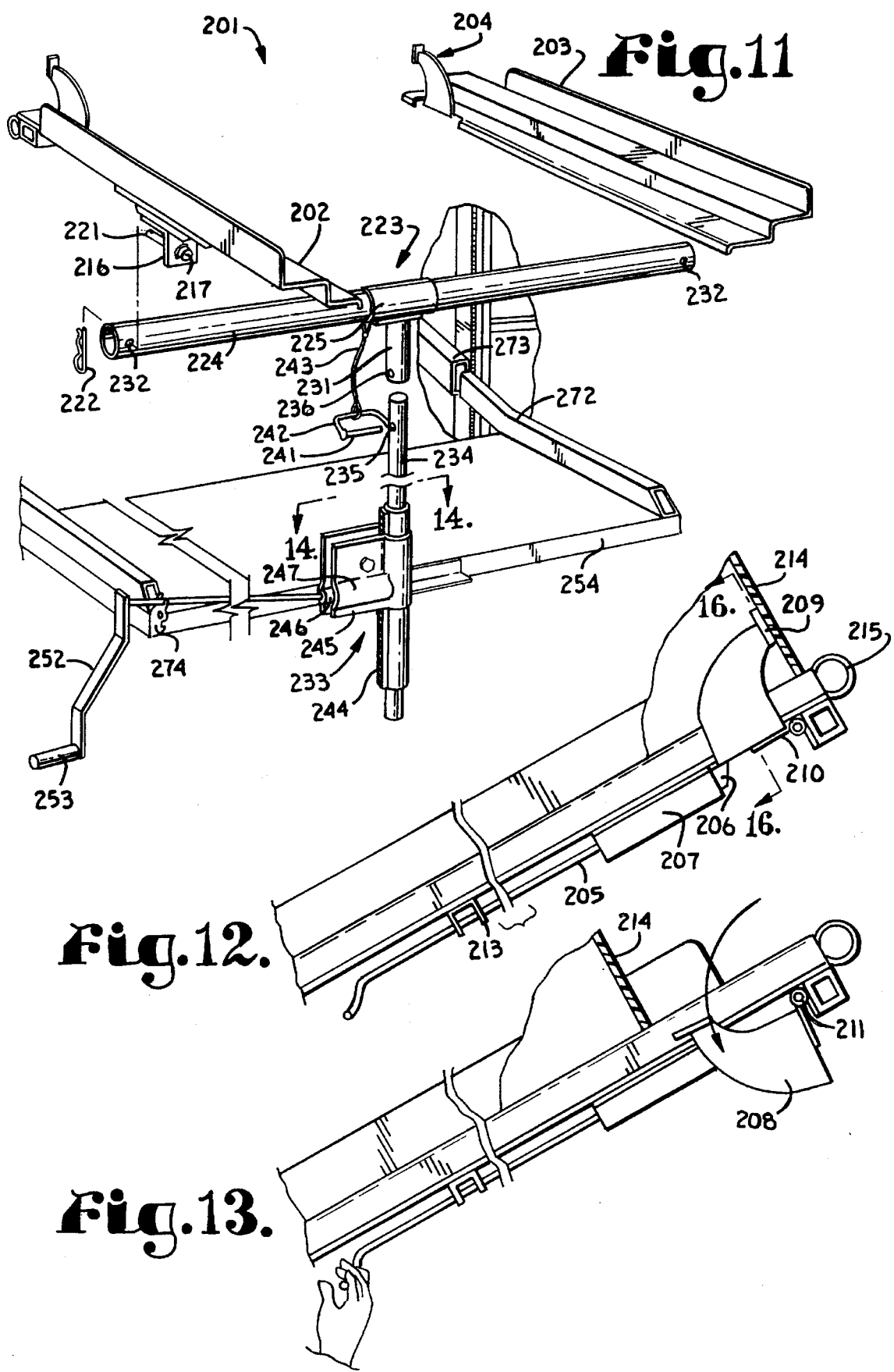
FIG. 11 is an enlarged, exploded view of the unloading system illustrating the parts thereof and their interconnection.
FIG. 12 is an enlarged, fragmentary side elevational view of one of the unloading ramps, with a pickup cover support arm placed in a cover supporting position.
FIG. 13 is an enlarged, fragmentary side elevational view of one of the unloading ramps, with the cover support arm placed in a cover releasing position.

Referring to FIGS. 8–16, and particularly to FIG. 11, an unloading system 201 includes a pair of unloading ramps 202 and 203. Each of the ramps 202 and 203 includes a pivotable article holding arm 204 which is remotely controllable via an elongate rod 205. The rods 205 are connected to a spring loaded latching member 206 which is adapted to move within a rectangular sleeve 207. Referring to FIGS. 12, 13 and 16, the holding arm 204 includes a curved plate 208 to which is attached a resilient pad 209. The plate 208 is attached to a pivot plate 210 which is pivotably attached to the ramp 202 via a pivot mount 211. A rod support bracket 213 is attached to the underneath side of the ramps 202, 203 to support the rod 205. FIG. 12 shows the arm 204 pivoted upward into contact with a rear wall 24 of a pickup truck cover 22. At FIG. 13, when a workman pulls the rod 205, the latching member 206 is pulled backward against the action of a spring (not shown) in the sleeve 207, thus allowing the arm 204 to drop out of contact with the rear wall 24 of the cover 22, and allowing the cover 22 to be slid off of the ramps 202 and 203.

Each of the ramps 202 and 203 also include an attachment sleeve 215 which is adapted to mate with a corresponding bolt (not shown) on each side of and below the topmost article slot 99 on the article rack 10. Each of the ramps 202 and 203 includes an L shaped bracket 216 attached to the lower side thereof, with a pin 217 attached thereto. The pins 217 each include a bore 221 for receiving a cotter pin 222. A cross-member 223 comprises a cylindrical pipe 224 attached to a horizontally oriented sleeve 225. The sleeve 225 is attached to a vertically oriented sleeve 231 to form a T shape. The pipe 224 includes a pair of bores 232 oriented to receive the pins 217 of the ramps 202 and 203.

A screw jack assembly 233 includes a rod 234 which is sized to fit within the sleeve 231. The rod 234 includes a bore 235 which is aligned with a similar bore 236 in the sleeve 231. A pin 241 is attached to a U shaped retaining member 242, which is, in turn, attached to the pipe 224 via a tether 243. The pin 241 is insertable through the bores 235 and 236 to retain the rod 234 in place on the sleeve 231. The jack assembly 233 includes a conventional ratcheted member 244 attached to the rod 234, a two-sided plate 245 and an elevating screw 246 inserted through a channel 247 in the plate 245. An elongate rod 251 is pivotably attached to the screw 246 and a crank 252 and a handle 253 are attached to the rod 251. Referring to FIGS. 14 and 15, the jack assembly 233 is removably and pivotably attachable to a workman's platform 254 via a sleeve 255 attached to the jack plate 245. A sleeve 261 attached to the platform 254 includes a slot 262 sized to receive the sleeve 255. A slidable pin 263 with a handle 264 can be selectively slid into position within the sleeves 255 and 261 to secure the jack assembly 233 to the platform 254. Once in the securing position illustrated in FIG. 14, the handle 264 can be rotated inside of a locking member 265 to hold the pin 263 in place. The locking member 265 is attached to an angle section 271 which is bolted to the platform 254.

Referring again to FIG. 11, the platform 254 is preferably constructed of heavy gauge metal, and is sized to allow a pair of workmen to comfortably stand and work therefrom. The platform 254 includes a pair of arms 272, one of which is illustrated in FIG. 11. Each arm 272 extends past the rear of the platform 254 and then upward at an angle therefrom. A pair of sleeves 273, again with only one illustrated in FIG. 11, are positioned within the article rack 10. A jack rod securing bracket 274 is provided for holding the jack rod 251 in position during raising and lowering operations.

VIII. Article Latching Assembly

Referring to FIGS. 10, 17 and 18, an alternative article latching assembly 291 is illustrated. The assembly 291 includes an elongate rod 292 which is pivotably attached at one end to a handle 293. The handle 293 is, in turn, pivotable attached to the underneath side of one cross member 78 of each article slot 99 at a pivot point 294. The rod 292 includes an eyelet 295 at the other end which is inserted through a corresponding eyelet 296 in one end of a curved rod 301. The curved rod 301 extends through a bore 302 in a bracket 303 mounted atop the cross member 78 with the curved rod 301 extending outward from the bracket 303 a distance sufficient to pass beneath the side of a pickup cover 22 placed within the rack 10. A resilient damping member 304 is attached to the other end of the curved rod 301 and extends transversely thereto. The latching assembly 291 is designed to latch an article, such as the pickup truck cover 22 in position within the rack 10 when the handle 293 is pulled backward but to allow a workman stationed outside the trailer 12 to remotely release the cover 22 by pushing forward on the handle 293.

IX. Operation of Article Rack

Although the article rack 10 of the present invention has many conceivable uses, an exemplary use is for transporting pickup truck covers 22 on a trailer 12 or other vehicle. The pickup truck covers 22 can be loaded by opening the overhead door assemblies 142 whereby the doors 144 are placed in their retracted positions, which opens the openings 83, 140. Cover front ends 24 can be placed on respective, opposed pairs of rail members 86. By pushing on the cover back ends 26, the covers 22 can be inserted into the trailer 12.

The retainer brackets 102 can be held in their release positions (FIG. 7) during insertion of the covers 22; alternatively, the retainer brackets 102 can be spring-biased to their lock positions and can be pushed over by the front ends 24 of covers 22 being inserted. When the cover front ends 24 pass the retainer brackets 102, the retainer brackets 102 either spring or are actuated (e.g. by the retainer actuating mechanisms 111) to their respective locked positions (FIG. 6) whereupon the retainer bracket upper flanges 104 engage the cover front end lower edge flanges 36 (FIG. 6). The retainer hinges 110 have pivotal axes below the level of the second rail mounting members 94 whereby the retainer bracket webs 108 engage the second rail mounting members 94, which act as stops against further rotation of the retainer brackets 102 from their lock positions until they are actuated by the retainer actuating mechanisms 111.

As an alternative to the retaining mechanisms 100, various other retaining means could be provided for securing the covers 22 in their respective article-receiving spaces 99, including C-clamps for clamping to the rail members 86. As a further alternative to the retainer mechanism 100, various solenoid-actuated, pneumatic, hydraulic or keyed retainer mechanisms could be provided for security and theft protection.

The covers 22 are slid on and supported by the rail members 86. Each article-receiving space 99 is adapted to receive a respective cover 22, although smaller covers can be placed under larger covers for transporting multiple covers in a nested configuration in a single article-receiving space. Covers 22 with configurations as shown (i.e., rearwardly and downwardly sloping back ends 26) are preferably placed in the article-receiving spaces with their front ends 24 inserted first for positioning adjacent to the frame structure second side 62. The downwardly-and-rearwardly sloping cover back ends 26 are thus positioned substantially parallel to and in proximity to the frame structure first side 60 for maximum space utilization. A cover 22 with an overall length greater than the trailer 12 overall width can thus be placed within the enclosure system 20 due to the sloping position of the covers 22. The slope of the rail member 86, which determines the slope of the covers 22, can vary to accommodate particular dimensional requirements of articles to be placed on the article rack 10; fifteen degrees from the horizontal can be advantageously employed for certain covers 22.

With the covers 22 in place, the doors 144 are extended to their closed positions, and their distal ends 150 are attached or locked to the chassis. The trailer 12 is thus secured for transport with the covers 22 comprising its load substantially enclosed and securely retained on the article rack 10.

Upon reaching a destination, the doors 144 are retracted on the take-up reel mechanism 146 and the retainer mechanisms 100 are actuated to place the retainer brackets 102 in their release positions, e.g. by pushing inwardly and upwardly on the covers 22 and pulling the release handles 118 to swing the retainer brackets 102 downwardly (counterclockwise in FIGS. 6 and 7) so that the cover lower edge flanges 36 clear the retainer bracket upper flanges 104 whereby the covers 22 can slide along the rail members 86 and out of the trailer 12.

The sloping position of the loaded covers 22, in addition to minimizing overall trailer width, provides an important advantage in the loading and unloading process, especially for the upper article-receiving spaces 99. The loading operation can be initiated and the unloading operation can be finalized with the cover front ends 24 resting on the rail member first or lower ends and the cover back ends 26 at substantially lower levels. The covers 22 can thus be loaded by sliding them upwardly and can be unloaded by sliding them downwardly, which can be considerably more convenient for workers manually loading and unloading the trailer 12 than article rack systems where the articles, especially relatively long articles such as the covers 22, must be loaded and unloaded horizontally.

IX. Operation of The Article Unloading System

Once the trailer 12 has reached a final destination and the articles, such as pickup truck covers 22, are to be unloaded, the covers 22 in the upper slots 99 are difficult or impossible for workmen to reach from the ground. Thus, referring to FIGS. 9, 10 and 8, in that order, the unloading system 201 is attached to the rack 10 from which a cover 22 is to be unloaded from a top slot 99, as described below.

The ramps 202 and 203 are first pivotally attached to bolts (not shown) in the rack 10 just below the topmost slot 99. The cross member 223 is then slid over the bolts 217 in each ramp 202 and 203 and locked in place via the cotter pins 222. The workman's platform 254 is then slid into place in the channels 273 and the jack assembly 233 is connected between the platform 254 and the cross member 223. The system 201 is then ready for the top cover 22 to be unloaded, as shown in FIG. 9.

The jack handle 253 is then rotated in a direction to cause the cross member 223 and thus the ramps 202 and 203 to pivot upward to the upper position, as illustrated in solid lines in FIG. 10. One, or preferably, two workmen then get onto the platform 254 and pull the cover 22 out onto the ramps 202 and 203, to the position as shown in FIG. 10. The pivoting arms 204 are then raised to engage the rear wall 24 of the cover 22 and held in place via the latch 206, and the workmen return to the ground.

Figure 8:
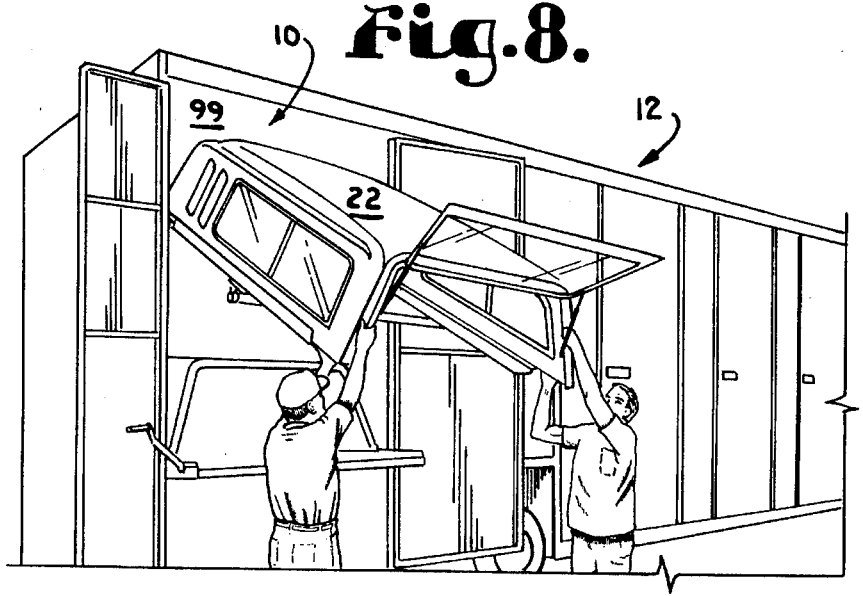
FIG. 8 is a perspective view of the unloading system positioned on a pickup truck cover trailer and with a pickup truck cover being off-loaded by two workmen.

The ramps 202 and 203 are then lowered via the jack handle 253 through the arc shown in phantom lines in FIG. 10, to a lowered, unloading position as illustrated in FIG. 8. When the workmen are in place on either side of the cover 22, the pivoting arms 204 are then remotely released via the rods 205, and the cover 22 is slid off of the ramps 202 and 203 to be easily transported by hand to a final destination.

If the trailer 10 and rack 12 is equipped with the remotely operated clamping system 291, the clamp 304 would be remotely released by the workmen via the handle 293 while they are standing on the platform 254 prior to sliding the cover 22 onto the ramps 202 and 203.

Once the topmost cover 22 has been unloaded from the first rack 10, the ramps 202 and 203, cross member 223 and jack assembly 233 can remain assembled while the unloading system 201 is moved from one rack 10 to the next. The jack assembly 233 needs merely to be released from the platform 254 and the platform 254 can be moved independently to the next rack 10 as well.

It is to be understood that while certain forms of the present invention have been illustrated and described herein, it is not to be limited to the specific forms or arrangement of parts described and shown.

What is claimed and desired to be secured by Letters Patent is as follows:

1. An article unloading system for unloading articles from an article rack with a plurality of article holding slots, at least some of which are stacked vertically, comprising:

(a) an unloading ramp means comprising a pair of unloading ramps interconnected via a cross member;

(b) means for removably and pivotably attaching a first end of said ramp means to said article rack at a respective pivot point, said pivot point being below a topmost one of said slots;

(c) a jack means attached to said ramp means for selectively changing the angle of said ramp means relative to said article rack, said jack means being removably and pivotably attachable to said cross member for selectively raising and lowering said cross member along with said pair of unloading ramps.

2. A system as in claim 1, and further comprising:

(a) a workman's platform removably attachable to said article rack below the pivot point of said unloading ramps;

(b) means for removably and pivotally attaching said jack means to said workman's platform.

3. A system as in claim 2, wherein:

(a) said workman's platform, when attached to said article rack, is within reach of an article to be unloaded.

4. A system as in claim 3, wherein:

(a) said article rack is adapted to hold a plurality of pickup truck covers in a like plurality of said article holding slots.

5. A system as in claim 1 and further comprising:

(a) article securing means attached to at least one of said unloading ramps near said first end; and (b) means attached to said at least one ramp for selectively releasing said article securing means, said means for selectively releasing including a release mechanism positioned near a second end of said at least one ramp.

6. A system as in claim 5, wherein:

(a) said article securing means comprises an article securing arm pivotably attached near said first end of said at least one ramp, said article securing arm being pivotable between a raised, article securing position and a lowered, article releasing position, said arm being weighted to normally assume said lowered position; and (b) said means; for selectively releasing comprising a spring loaded latch which is adapted to engage said arm to hold it in said raised position and an elongate rod attached to said latch such that said rod, when pulled, urges said latch against a spring to thereby release said arm which then pivots to said lowered position.

7. A system as in claim 6, wherein:

(a) each of said unloading ramps includes an article securing means and a means for selectively releasing.

8. A system as in claim 6, wherein:

(a) said article rack is adapted to hold a plurality of pickup truck covers in a like plurality of said article holding slots; and (b) said article to be unloaded is a pickup truck cover.

9. A system as in claim 8, wherein:

(a) said article securing arm is adapted to engage a rear wall of said pickup truck cover resting on said unloading ramps when said securing arm is in said raised position.

10. A system as in claim 8, and further comprising:

(a) means for securing a rear wall of said pickup truck cover when said pickup truck cover is positioned within said topmost slot, said means for securing being positioned near a rear wall of said article slot; and (b) means for remotely releasing said means for securing, said means for releasing being positioned near a from wall of said article slot.

11. A system as in claim 10, wherein:

(a) said means for securing comprises a pivotable clamp; and (b) said means for remotely releasing comprises an elongate rod attached at one end to said pivotable clamp and at the other end to a handle which handle is pivotably attached beneath said article slot.

12. An unloading system for unloading a pickup truck cover from an upper slot of a support rack, said support rack including a plurality of slots with at least some of said slots being stacked vertically, the system comprising:

(a) an unloading ramp means;

(b) means for removably and pivotably attaching a first end of said ramp means to said support rack at a respective pivot point immediately beneath said upper slot, said ramp means being positioned such that said pickup truck cover can be fully supported thereon; and (c) jack means removably and pivotably attachable to said ramp means for selectively raising and lowering said ramp means to thereby change the inclination thereof relative to said upper slot.

13. A system as in claim 12, and further comprising:

(a) a workman's platform removably attachable to said support rack below the pivot point of said unloading ramp means;

(b) means for removably and pivotably attaching said jack means to said workman's platform.

14. A system as in claim 13, wherein:

(a) said workman's platform, when attached to said support rack, is within reach of said pickup truck cover to be unloaded.

15. A system as in claim 13, and further comprising:

(a) pickup truck cover securing means attached to said unloading ramp means near said first end; and (b) means attached to said ramp means for selectively releasing said securing means, said means for selectively releasing including a release mechanism positioned near a second end of said ramp means.

16. A system as in claim 15, wherein:

(a) said securing means comprises a securing arm pivotably attached near said first end of said ramp means, said article securing arm being pivotable between a raised, cover securing position and a lowered, cover releasing position, said arm being weighted to normally assume said lowered position; and (b) said means for selectively releasing comprising a spring loaded latch which is adapted to engage said arm to hold it in said raised position and an elongate rod attached to said latch such that said rod, when pulled, urges said latch against a spring to thereby release said arm which is then free to pivot to said lowered position.

17. A system as in claim 16, wherein:

(a) said unloading ramps means comprises a pair of unloading ramps connected by a cross member; and (b) each of said unloading ramps includes a cover securing means and a means for selectively releasing.

18. A system as in claim 17, wherein:

(a) each said securing arm is adapted to engage a rear wall of said pickup truck cover resting on said unloading ramps when said securing arm is in said raised position.

19. A system as in claim 18, and further comprising:

(a) means for securing a rear wall of said-pickup truck cover when said pickup truck cover is positioned within said slot on said support rack, said means for securing being positioned near a rear wall of said slot; and (b) means for remotely releasing said means for securing, said means for releasing being positioned near a front wall of said article slot.

20. A system as in claim 19, wherein:

(a) said means for securing comprises a pivotable clamp; and (b) said means for remotely releasing comprises an elongate rod attached at one end to said pivotable clamp and at the other end to a handle which handle is pivotably attached to said support rack beneath said slot.

21. A method of unloading a pickup cover from a slot in an article rack, said article rack including a plurality of slots with at least some of said slots stacked vertically, comprising the steps of:
- (a) pivotably connecting an unloading ramp means to said rack immediately beneath a topmost one of said slots;
- (b) connecting a workman's platform to said rack below said unloading ramp means;
- (c) connecting a jack means for selectively raising and lowering said unloading ramp means between said workman's platform and said ramp means;
- (d) raising said unloading ramp means to an elevated position via said jack means;
- (e) mounting said workman's platform to allow access to said pickup cover and pulling said pickup cover out of said rack and onto said unloading ramp means;
- (f) lowering said ramp means to a lowered position via said jack means; and
- (g) removing said pickup cover from said ramp means.

22. A method as in claim 21, and further comprising the steps of:
- (a) prior to said lowering step, placing a pickup truck cover securing arm in engagement with a rear wall of said pickup truck cover; and
- (b) prior to said removing step, remotely releasing said securing arm from engagement with said pickup truck cover rear wall.

23. An article unloading system for unloading pickup covers from an article rack, said article rack being adapted to hold a plurality of said pickup truck covers in a like plurality of article holding slots, at least some of said slots being vertically stacked on said rack, comprising:
- (a) an unloading ramp means, said ramp means comprises a pair of unloading ramps connected by a cross member;
- (b) means for removably and pivotably attaching a first end of said ramp means to said article rack at a respective pivot point, said pivot point being positioned below a topmost slot on said rack;
- (c) means attached to said ramp means for selectively changing the angle of said ramp means relative to said article rack;
- (d) article securing means attached to at least one of said unloading ramps near said first end; and
- (e) means attached to said at least one ramp for selectively releasing said article securing means, said means for selectively releasing including a release mechanism positioned near a second end of said at least one ramp;
- (f) a pivotable clamp for securing a rear wall of said pickup truck cover when said pickup truck cover is positioned within said topmost slot, said means for securing being positioned near a rear wall of said article slot; and
- (g) means for remotely releasing said means for securing, said means for releasing being positioned near a front wall of said article slot and comprising an elongate rod attached at one end to said pivotable clamp and at the other end to a handle which handle is pivotably attached beneath said topmost article slot.

24. An unloading system for unloading a pickup truck cover from an upper slot of a support rack, comprising:
- (a) an unloading ramp means;
- (b) means for removably and pivotably attaching a first end of said ramp means to said support rack at a respective pivot point immediately beneath said slot, said ramp means being positioned such that said pickup truck cover can be fully supported thereon;
- (c) jack means removably and pivotably attachable to said ramp means for selectively raising and lowering said ramp means;
- (d) a workman's platform removably attachable to said support rack below the pivot point of said unloading ramp means, said platform, when attached, being within reach of said upper slot and said pickup truck cover to be unloaded; and
- (e) jack means removably and pivotably attachable between said ramp means and said workman's platform for selectively raising and lowering said ramp means.

* * * * *